US012106418B2

(12) United States Patent
Ghodrat et al.

(10) Patent No.: US 12,106,418 B2
(45) Date of Patent: Oct. 1, 2024

(54) SAMPLING FOR PARTIALLY RESIDENT TEXTURES

(71) Applicant: Advanced Micro Devices, Inc., Santa Clara, CA (US)

(72) Inventors: Fataneh F. Ghodrat, Boxborough, MA (US); Michael Lee Grossfeld, Boxborough, MA (US); Kevin Warren Furrow, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 31 days.

(21) Appl. No.: 17/084,520

(22) Filed: Oct. 29, 2020

(65) Prior Publication Data

US 2021/0304488 A1 Sep. 30, 2021

Related U.S. Application Data

(60) Provisional application No. 62/994,441, filed on Mar. 25, 2020.

(51) Int. Cl.
| | |
|---|---|
| *G06T 15/04* | (2011.01) |
| *G06T 1/20* | (2006.01) |
| *G06T 7/40* | (2017.01) |
| *G06T 11/00* | (2006.01) |
| *G06T 11/40* | (2006.01) |
| *G06T 15/50* | (2011.01) |
| *G06T 19/20* | (2011.01) |

(52) U.S. Cl.
CPC ............... *G06T 15/04* (2013.01); *G06T 7/40* (2013.01); *G06T 11/001* (2013.01); *G06T 2210/36* (2013.01)

(58) Field of Classification Search
CPC ..... G06T 15/04; G06T 15/005; G06T 15/503; G06T 2200/28; G06T 2210/36; G06T 1/20; G06T 15/80; G06T 1/60; G06T 11/40; G06T 17/20; G06T 19/20; G06T 15/40; G06T 11/001; G06T 5/001; G06T 7/528; H04N 19/43–51
See application file for complete search history.

(56) References Cited

U.S. PATENT DOCUMENTS

| | | | |
|---|---|---|---|
| 7,948,500 B2 | 5/2011 | Newhall, Jr. | |
| 8,823,724 B2 | 9/2014 | Duluk, Jr. et al. | |
| 8,907,969 B2 | 12/2014 | Frisinger | |
| 10,540,802 B1 * | 1/2020 | Kazakov | ............... G06T 15/005 |
| 2008/0106552 A1 * | 5/2008 | Everitt | .................. G06T 11/001 345/552 |
| 2008/0303841 A1 * | 12/2008 | Newhall, Jr. | ......... G06T 15/005 345/587 |
| 2011/0157207 A1 * | 6/2011 | Hall | ....................... G06T 15/04 345/582 |
| 2013/0328895 A1 * | 12/2013 | Sellers | ..................... G06T 1/20 345/522 |
| 2018/0232940 A1 * | 8/2018 | Goossen | ............... G06T 15/503 |
| 2019/0066352 A1 * | 2/2019 | Kazakov | .................. G06T 9/00 |
| 2020/0250877 A1 * | 8/2020 | Kazakov | ................ G06T 15/04 |

* cited by examiner

*Primary Examiner* — Wesner Sajous
(74) *Attorney, Agent, or Firm* — Volpe Koenig

(57) ABSTRACT

Devices, systems, and methods for sampling partially resident texture data. An instruction which includes a residency map descriptor is received. The instruction is executed to retrieve partially resident texture data from a mipmap stored in a memory based on the residency map descriptor. The residency map descriptor includes a residency map.

18 Claims, 8 Drawing Sheets

SAMPLING FOR PARTIALLY RESIDENT TEXTURES

CROSS-REFERENCE TO RELATED APPLICATIONS

This application claims the benefit of U.S. Provisional Patent Application No. 62/994,441 filed Mar. 25, 2020 and is incorporated by reference as if fully set forth herein.

BACKGROUND

Texture mapping is a method for adding detail, surface texture, color, or other attributes to a computer-generated graphic or three-dimensional (3D) model. When rendering computer-generated graphics, one or more textures can be applied (or mapped) to each geometric primitive of the graphic. These textures contain, for example, color, luminance, and/or other data to be mapped to each of the geometric primitives.

Mipmaps are pre-calculated, optimized collections of texture images at different resolutions. Typically, prior to rendering a graphics scene, all textures and associated mipmaps for the scene must be resident, or partially resident in video memory. A texture that is partially resident in video memory can be referred to as a partially resident texture (PRT).

BRIEF DESCRIPTION OF THE DRAWINGS

A more detailed understanding can be had from the following description, given by way of example in conjunction with the accompanying drawings wherein.

DETAILED DESCRIPTION

Figure 1:
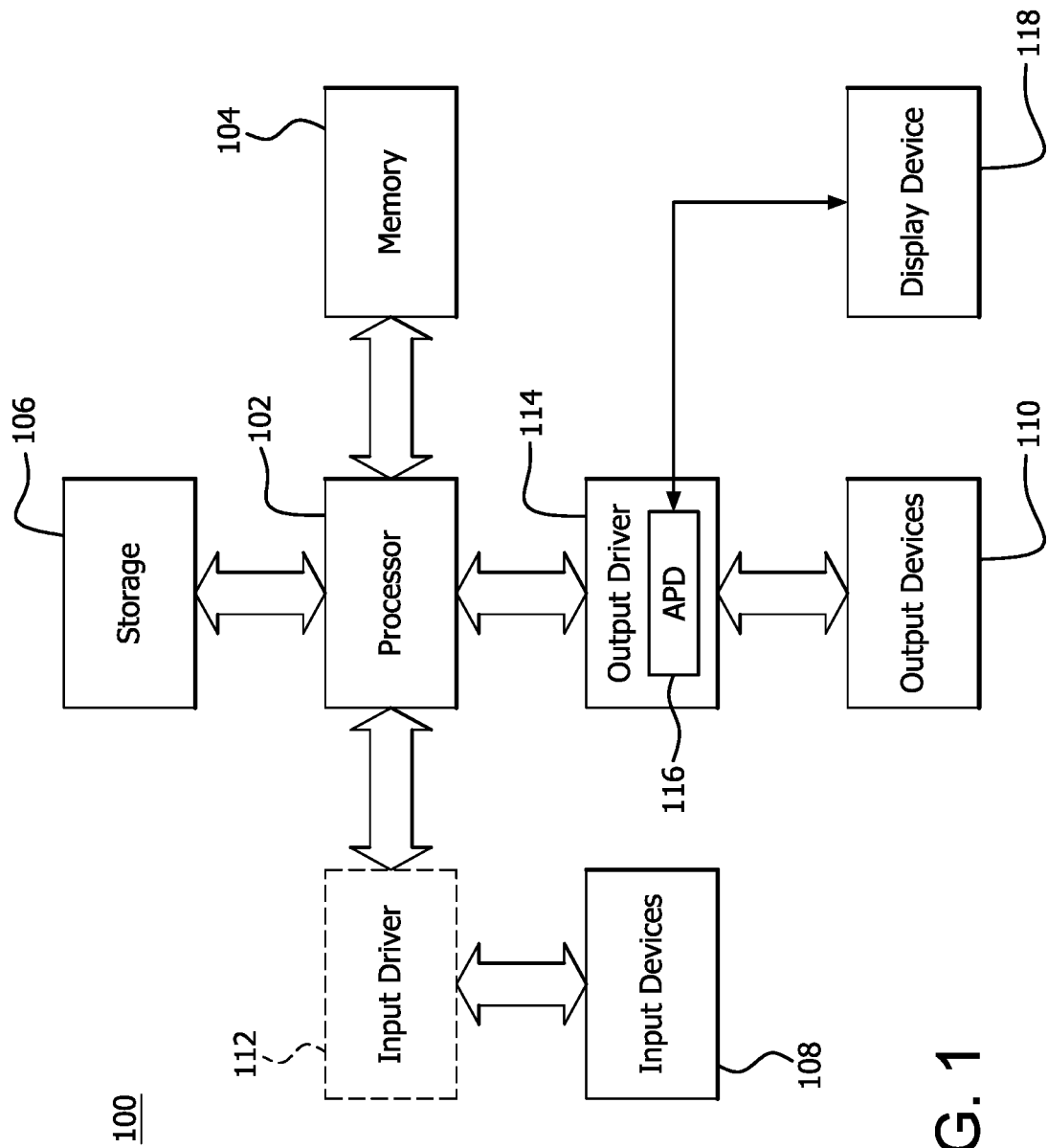
FIG. 1 is a block diagram of an example device in which one or more features of the disclosure can be implemented.

Some implementations provide a method for sampling partially resident texture data. An instruction which includes a residency map descriptor is received. The instruction is executed to retrieve partially resident texture data from a mipmap stored in a memory based on the residency map descriptor.

In some implementations, the residency map descriptor includes a residency map. In some implementations, the residency map descriptor includes information indicating how a residency map is stored in the memory. In some implementations, the residency map descriptor includes a specification of a register that stores the residency map descriptor. In some implementations, the residency map descriptor includes a specification of a register that stores a residency map. In some implementations, the instruction includes an indication of an image sample and an indication of a mipmap descriptor, further comprising executing the instruction to retrieve partially resident texture data from a mipmap stored in the memory based on the residency map descriptor, the indication of the image sample, and the indication of the mipmap descriptor. In some implementations, the image sample includes coordinates of an image. In some implementations, the indication of the image sample includes a specification of a register that stores the image sample.

In some implementations, the mipmap descriptor includes information indicating how the mipmap is stored in the memory. In some implementations, the indication of the mipmap descriptor includes a specification of a register that stores the mipmap descriptor.

Some implementations provide a processor configured for sampling partially resident texture data. The processor includes circuitry configured to receive an instruction which includes a residency map descriptor. The processor also includes circuitry configured to execute the instruction to retrieve partially resident texture data from a mipmap stored in a memory based on the residency map descriptor.

In some implementations, the residency map descriptor includes a residency map. In some implementations, the residency map descriptor includes information indicating how a residency map is stored in the memory. In some implementations, the residency map descriptor includes a specification of a register that stores the residency map descriptor. In some implementations, the residency map descriptor includes a specification of a register that stores a residency map. In some implementations, the instruction includes an indication of an image sample and an indication of a mipmap descriptor, and wherein the circuitry is configured to execute the instruction to retrieve partially resident texture data from a mipmap stored in the memory based on the residency map descriptor, the indication of the image sample, and the indication of the mipmap descriptor. In some implementations, the image sample includes coordinates of an image. In some implementations, the indication of the image sample includes a specification of a register that stores the image sample. In some implementations, the mipmap descriptor includes information indicating how the mipmap is stored in the memory. In some implementations, the indication of the mipmap descriptor includes a specification of a register that stores the mipmap descriptor.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
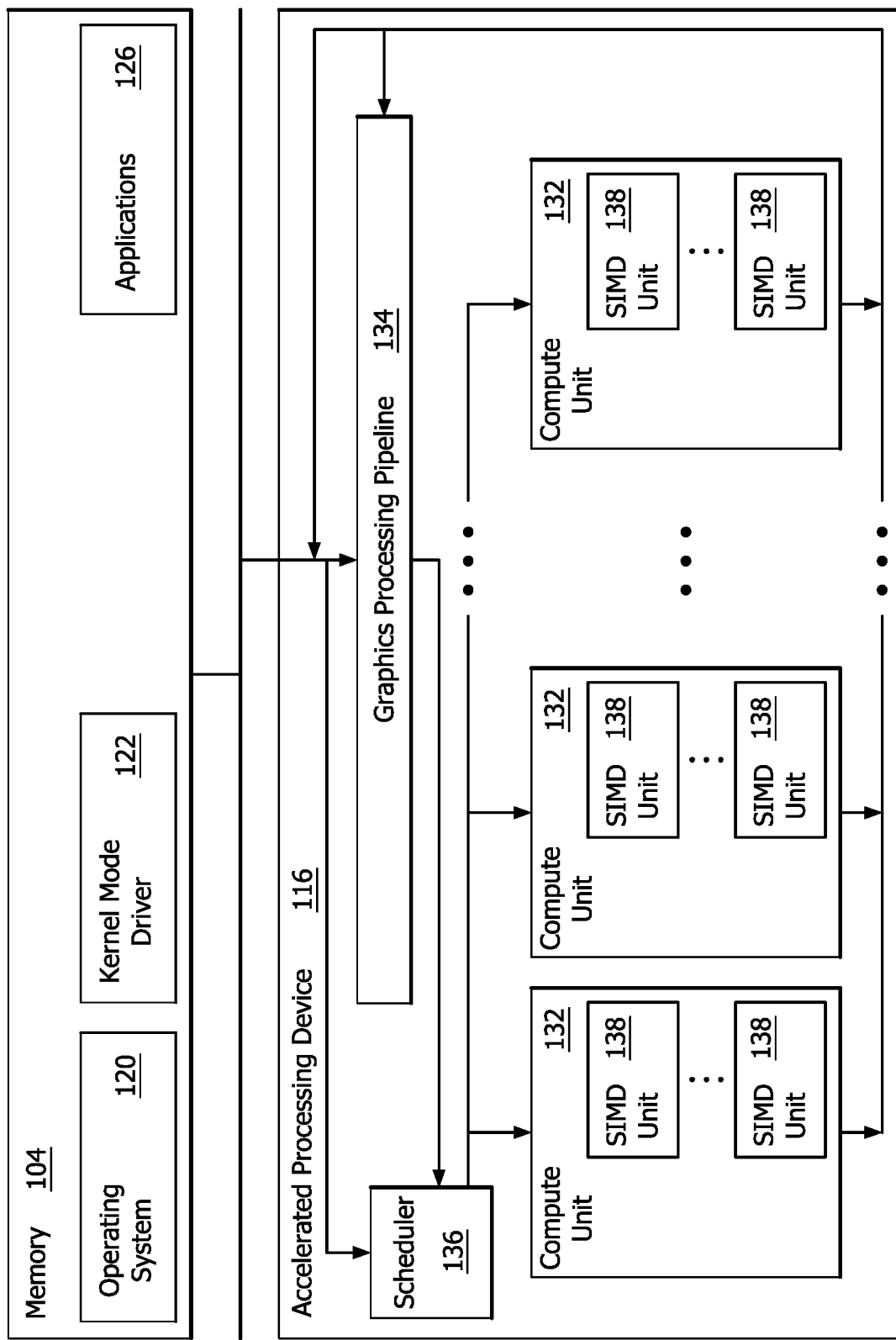
FIG. 2 illustrates details of the device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
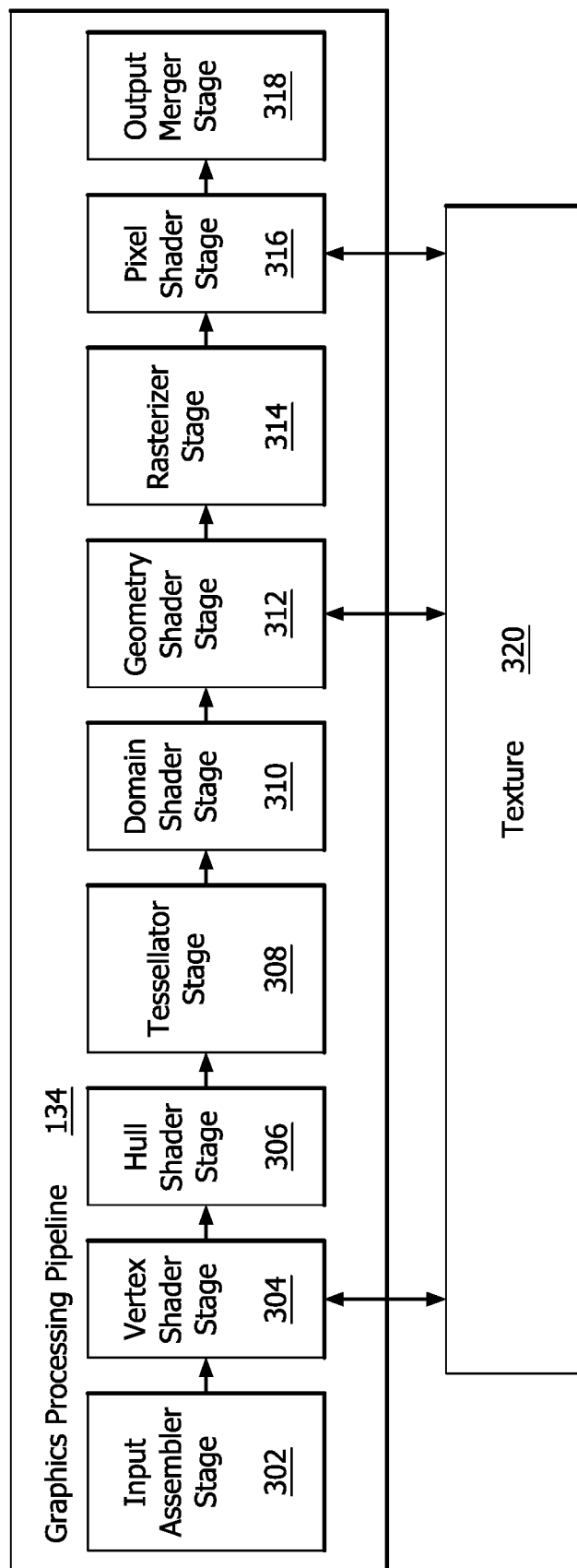
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives and generated upstream. Rasterization includes determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

In the field of computer graphics, a texture map, or texture, is a set of data that can be applied to the surface of a primitive. In some cases, the texture is an image, such as a bitmap image. Textures are typically two dimensional (2D), however textures are one dimensional (1D), three dimensional (3D), or have other degrees of dimensionality in some cases. In some cases, textures are mathematical functions rather than images.

Textures are usually applied to 3D graphics primitives by mapping points on the texture to points on the primitive. Applying textures to a 3D graphics object made up of primitives in this way is comparable to wrapping a real-life object with a patterned paper or skin.

In some cases, the complexity of a scene does not require the full resolution of a texture. For example, as a primitive moves away from a viewer it appears smaller, and the complexity of the objects visible to the viewer decreases. In some such cases, a lower resolution version of the texture is loaded into memory instead of the full resolution texture, saving memory space. The complexity of the 3D model representation from the perspective of the user is referred to as its "level of detail" (LOD). LOD is adjusted for other reasons in some case. Objects of lesser importance have a relatively lower LOD in some cases, for example.

A mipmap is a set of bitmap images of a texture, which typically includes the full resolution texture and downsized duplicates of the full resolution texture at progressively lower resolutions. If the complexity of a 3D graphics primitive is sufficient, the full resolution (i.e., highest LOD) texture is sampled from the mipmap and applied to the primitive. If the complexity of the 3D graphics primitive is not sufficient (e.g., as the primitive moves away from the viewer, the primitive appears smaller) a lower LOD version of the texture is sampled from the mipmap and applied to the primitive. In some cases, different LOD versions of the texture from the mipmap are interpolated or otherwise processed to provide an intermediate resolution.

In some applications, all textures and mipmaps for a scene are required to be resident in video memory prior to rendering a scene. If the video memory is not large enough for all textures and associated mipmaps for the scene to be fully resident in video memory, the size, resolution, and/or LOD of the textures may need to be reduced in order to make the textures and mipmaps fully resident.

In some applications, only a portion of the textures and associated mipmaps are required to be resident in video memory. In some cases, by specifying a maximum or minimum LOD, only parts of the texture and its associated mipmap are required to be resident in video memory. In such cases, the textures are referred to as partially resident textures (PRT).

Various permutations of fully and partially resident textures are possible in some cases. For example, in some cases all levels of the mipmap are resident in video memory, and the full texture is resident for each level.

In some cases, only some levels of the mipmap are resident in video memory, but the full texture is resident for each resident level. In some such cases, an application limits a shader view (e.g., via a shader resource descriptor (SRD)) to a subset of the levels of the mipmap. Levels of the mipmap that are resident in memory are contiguous in such cases (i.e., no skipped levels—"no holes in the middle of the chain"), however levels having the most detail, or least detail (i.e., "at the ends") are skippable by the application, in some cases. In some such cases, hardware (e.g., texture processing unit, SIMD processor, etc.) will clamp the LOD to the present mipmap level.

In some cases, only some levels of the mipmap are resident in video memory, and only some of the texture is resident for each resident level. Similar to cases where only some levels of the mipmap are resident in video memory and the full texture is resident for each resident level, except that memory resident levels of the mipmap are not required to be fully resident. In such cases, in addition to clamping the LOD, hardware assumes the value is zero for tiles that are not resident. This indication is available to applications and hardware (e.g., texture processing units, SIMD processors, etc.) that support PRT in some cases.

In some cases, some parts (e.g., tiles) of the texture are resident at different levels of the mipmap than other parts. In some such cases, all or only some of the levels of the mipmap are resident in memory. In some such cases, hardware will fetch each tile from the memory-resident level of the mipmap that is closest to the computed LOD. For example, if the hardware calculates LOD=0 for the tile, and the most detailed resident tile is of LOD=1, then the hardware fetches the tile at LOD=1. On the other hand, if the hardware calculates LOD=3 for the tile, and the most detailed resident tile is of LOD=1, then the hardware fetches the tile at LOD=3. This approach is referred to as minmip mapping or PRT++ in some cases.

Figure 4:
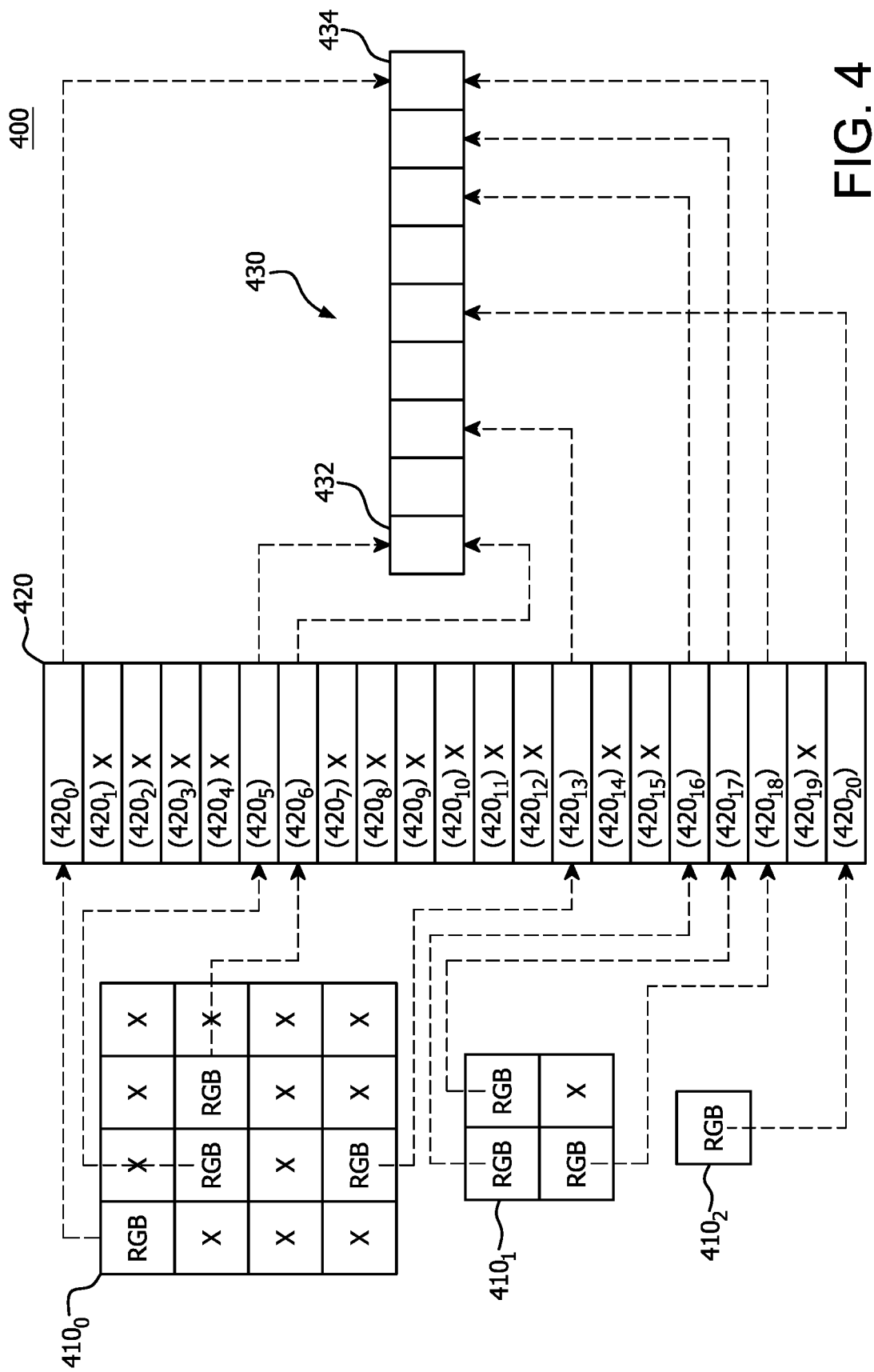
FIG. 4 illustrates an operation for sampling a partially resident texture, according to an example.

FIG. 4 is a block diagram which illustrates an example PRT mapping scheme 400. PRT mapping scheme 400 includes an example mipmap chain which includes three mipmaps $410_0$-$410_2$, a virtual memory 420, and a physical memory 430 (e.g., implemented in or by memory 104 or a local graphics memory of APD 116 as shown and described with respect to FIGS. 1 and 2, a memory of texture unit 320 as shown and described with respect to FIG. 3, or any other suitable physical memory). Mipmap $410_0$ represents a LOD for a texture. In this example, mipmap $410_0$ is the version of the texture that includes the greatest level of detail (e.g., is the highest resolution image) in the mipmap chain. Mipmap $410_1$ is a filtered or down-sampled version of mipmap $410_0$ and represents a lower detailed or lower resolution LOD than mipmap $410_0$ for the texture. Similarly, mipmap $410_2$ is a filtered or down-sampled version of mipmap $410_1$ and represents a lower detailed or lower resolution LOD than the LOD for mipmap $410_1$ for the texture. Mipmaps and the LOD associated with each of the mipmaps are known to a person skilled in the relevant art.

In the example of FIG. 4, mipmaps $410_0$-$410_2$ are partitioned into memory tiles. Each of mipmaps $410_0$-$410_2$ is partitioned into memory tiles (of the same size in this example). In this example, mipmap $410_2$ is represented by a single memory tile and represents the least detailed LOD in the mipmap chain $410_0$-$410_2$. Each of the memory tiles includes texel (i.e., texture pixel, the fundamental unit of the texture map) information for its respective mipmap. Although only three mipmaps are depicted in FIG. 4, a person skilled in the relevant art would understand that mipmap chain $410_0$-$410_2$ is exemplary, and that in some implementations the mipmap chain includes a greater number of mipmaps (providing a greater range of LOD) or fewer mipmaps (providing a lesser range of LOD) than the three mipmaps depicted in texture mapping scheme 400 of FIG. 4. Further, based on the description herein, a person skilled in the relevant art will recognize that the description herein is equally applicable to one- and three-dimensional textures, as well as arrays of various textures. In some cases, if mipmaps $410_0$-$410_2$ are smaller (in size) than a single memory tile, then one or more of mipmaps $410_0$-$410_2$ are loadable into a single memory tile in order to conserve memory resources.

In the example of FIG. 4, each of the memory tiles is associated with a respective address space in virtual memory 420. For instance, the memory tile associated with the top-left corner of mipmap $410_0$ (labeled "RGB") is associated with an address space $420_0$ in the page table of virtual memory 420 (indicated by a dashed line with an arrow). The memory tile to the immediate right of the top-left corner memory tile of mipmap $410_0$ (labeled "X") is associated with an address space $420_1$ in the page table of virtual memory 420.

It is noted that if two or more contiguous page table entries are relatively small in size (e.g., one or more mipmaps $410_0$-$410_2$ are loadable into a single memory tile), then these page table entries are mappable to a single address space in page table of virtual memory 420 in some implementations.

In a raster-like fashion (e.g., traversal from left to right, traversal down, and then traversal from left to right) in this example, each of the memory tiles from mipmaps $410_0$-$410_2$ is associated with a respective address space $420_0$-$420_{20}$ in the page table of virtual memory 420. The depicted association of the partitioned memory tiles of mipmaps $410_0$-$410_2$ to the page table of virtual memory 420 in FIG. 4 is exemplary; a person skilled in the relevant art will recognize that other schemes are available to associate the memory tiles of mipmaps $410_0$-$310_2$ to virtual memory 420.

After mipmaps $410_0$-$410_2$ are partitioned into memory tiles, a first subset of the memory tiles is mapped to respective address spaces in physical memory 430 of FIG. 4. Dashed lines with arrows in FIG. 4 indicate which of the memory tiles from mipmaps $410_0$-$410_2$ are mapped to respective address spaces in physical memory 430 in this example.

The memory tiles in the first subset to be mapped to physical memory 430 are selected in any suitable manner, by any suitable application. Physical memory 430 is implemented by any suitable hardware, e.g., such as shown and described with respect to FIGS. 1-3. The memory tile selection is based on any suitable criterion or criteria.

For example, memory tiles are selectable to the first subset based on one or more of the following factors: whether an application anticipates that the memory tiles will be needed in the texture mapping operation; and a predetermined LOD of a mipmap and one or more memory tiles associated with that mipmap. In other words, in an effort to reduce physical memory consumption, an application makes resident particular memory tiles associated with a mipmap chain (e.g., by issuing suitable instructions) in some cases.

For example, an application may instruct a processor to make resident the memory tile associated with mipmap $410_2$ (which has the lowest, or least detailed, LOD in the mipmap chain); to make resident a majority of the memory tiles associated with mipmap $410_1$ (the mipmap with the next highest is LOD with respect to mipmap $410_2$); and, to make resident a minority of the memory tiles associated with mipmap $410_0$ (which has the most detailed LOD in the mipmap chain).

In some cases, an optimization of physical memory space allocated to the texture mapping process is realized as a result of this mapping scheme, allowing more physical memory space for memory tiles with a more detailed LOD to be resident in video memory.

The example selection of the first subset of memory tiles to be mapped to physical memory 430 is indicated by memory tiles labeled "RGB" in the mipmap chain $410_0$-$410_2$. These selected memory tiles are associated with respective address spaces in virtual memory 420 (e.g., address spaces $410_0$, $410_5$, $410_6$, $410_{13}$, $410_{16-18}$, and $420_{20}$), which are mapped to respective address spaces in physical memory 430. With respect to the memory tiles from mipmaps $410_0$-$410_2$ that are not selected in the first subset of memory tiles (e.g., address spaces $410_{1-4}$, $410_{7-12}$, $410_{14}$, $410_{15}$, and $410_{19}$ from virtual memory 420), these memory tiles are marked as invalid (memory tiles labeled "X" in FIG. 4) and are not mapped to physical memory 430.

The first subset of memory tiles mapped to physical memory 430 share the same texture information, in some cases. In particular, address spaces in the page table of virtual memory 420 are mappable to the same address space in physical memory 430 in some cases. For example, address spaces 410; and $410_6$ in the page table of virtual memory 420 are each mapped to address space 432 in physical memory 430. Similarly, address spaces $420_0$ and $410_{18}$ in the page table of virtual memory 420 are each mapped to address space 434 in physical memory 430.

After the first subset of memory tiles have been mapped to physical memory 430 (i.e., made resident in physical memory 430), This information is accessible (e.g., via an API, and driver module, such as kernel mode driver 122 as shown and described with respect to FIG. 2) to an application (e.g., of applications 126 as shown and described with respect to FIG. 2) during a texture mapping operation.

The stored portions of the texture and associated mipmaps are referred to as a PRT, as only a portion of the texture and associated mipmaps are required to be resident in video memory for the texture mapping operation. This is in contrast to texture mapping operations requiring fully resident textures.

In order to apply the PRT to a primitive, the application issues a texture sampling instruction to the processor in some cases. In response to the texture sampling instruction, the processor return a status code in some examples. For example, the status code indicates a successful fetch of texture information requested by the application or a failure in the fetch of texture information requested by application. In some cases, the failure in the fetch of texture information is the result of an attempt to access information from a mipmap with a more detailed LOD than a mipmap currently resident in video memory.

In some cases, a residency map is used to track a partially resident texture and its associated mipmaps. The residency map is also referred to as a "minmip map", or LOD index table, in some cases.

Figure 5:
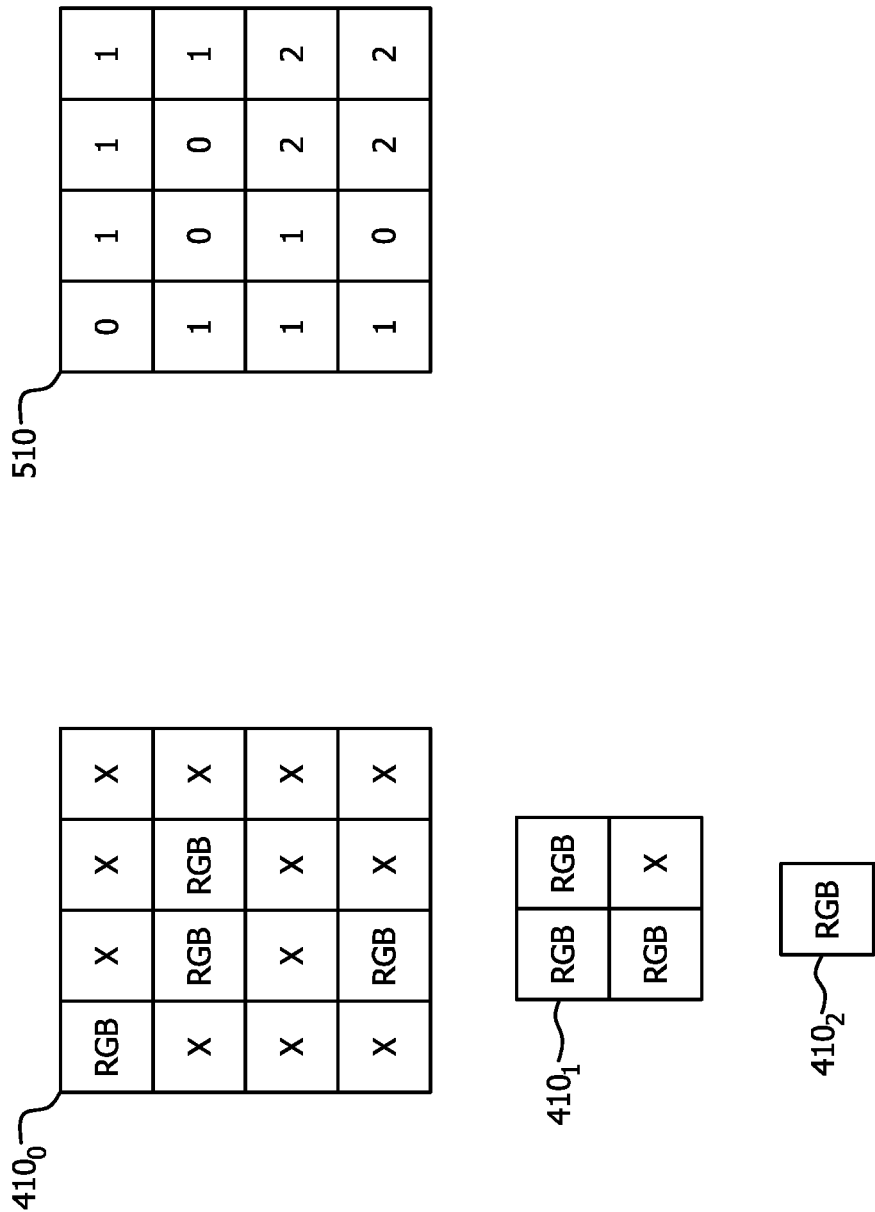
FIG. 5 is a block diagram illustrating example level of detail (LOD) index tables.

FIG. 5 is an illustration of an example residency map 510 that indicates available (i.e., memory resident) tiles of mipmaps $410_0$-$410_2$, as also shown and described with respect to FIG. 4. Residency map 510 indicates resident memory tiles that correspond to a mipmap tile of interest. For instance, with respect to residency map 510, the memory tile located in the upper left corner (labeled "0") corresponds to the resident memory tile located in the upper left corner of mipmap $410_0$ (labeled "RGB"). Here, the label "0" indicates that a texture is available for that tile at the level of mipmap $410_0$, and also at the less detailed levels $410_1$ and $410_2$.

In this example, the PRT and its associated mipmaps are tracked using a single residency map (e.g., only using residency map 510). In such cases, the value 0 in the memory tile located in the upper left corner indicates that a texture is available in the corresponding upper left corner at all levels of the mipmap chain, whereas the value 1 in the memory tile located in the upper right corner indicates that a texture is available in the corresponding upper right corner at levels 1 and 2. In other words, the residency map express mipmap availability at the indicated level and coarser (i.e., less detailed) in the mipmap chain.

For a non-resident memory tile such as, for example, the memory tile located in the upper right corner of mipmap $410_0$ (labeled "X"), memory tile information from a coarser (e.g., less detailed) LOD mipmap $410_1$ can be used. This is illustrated in residency map 510, where the memory tile located in the upper right corner (labeled "1") indicates that a texture is available in the corresponding upper right hand corner at level 1 (i.e., in the upper right corner of mipmap $410_0$ labeled "RGB") and level 2.

In some implementations, the application and/or processor tracks resident texture information via residency map 510. In some implementations, in order to sample a residency map-enabled texture, the sampling is handled using two dependent operations.

In some implementations, the first operation is a sampling instruction which includes coordinates to be read from the texture resource, and a resource descriptor for the residency map. The second operation is also a sampling operation, which includes coordinates to be read from the texture, the sampled LOD value, and the resource descriptor for the texture resource. In some implementations, the resource descriptor includes information describing the texture resource (i.e., the mipmap) including its dimensions, size, format, whether it has a residency map, etc. In some implementations, the residency map descriptor includes information describing the residency map, including its dimensions, size, format, etc.

Accordingly, in some implementations, a first texture instruction is executed to access residency map 510, and to calculate a particular LOD to fetch in the page table of virtual memory 420. Here, the first operation maps the image coordinates onto the residency map, based on the residency map resource descriptor, to sample an LOD value from the residency map, and returns the sampled LOD value.

In some implementations, the first texture instruction includes a descriptor for the residency map, and a sample of the image to which the texture will be applied, and in response to the first texture instruction, the processor returns the LOD corresponding to the sample from the residency map.

Since the entries of residency map 510 provide information on textures and associated mipmaps resident in video memory, the application is able to determine the LOD that is available for a texture sampling instruction.

Accordingly, in some implementations, the application issues a second texture instruction to the processor to access the mipmap based on the LOD returned by the first texture instruction (e.g., clamping the LOD to a particular maximum LOD), the sample of the image to which the texture will be applied, and a descriptor for the texture. In response to the second texture instruction, the processor returns the texture information corresponding to the image sample. Here, the second operation maps the image coordinates onto the mipmap, based on the mipmap resource descriptor, to sample a texture from the mipmap, and returns the sampled texture information.

Figure 6:
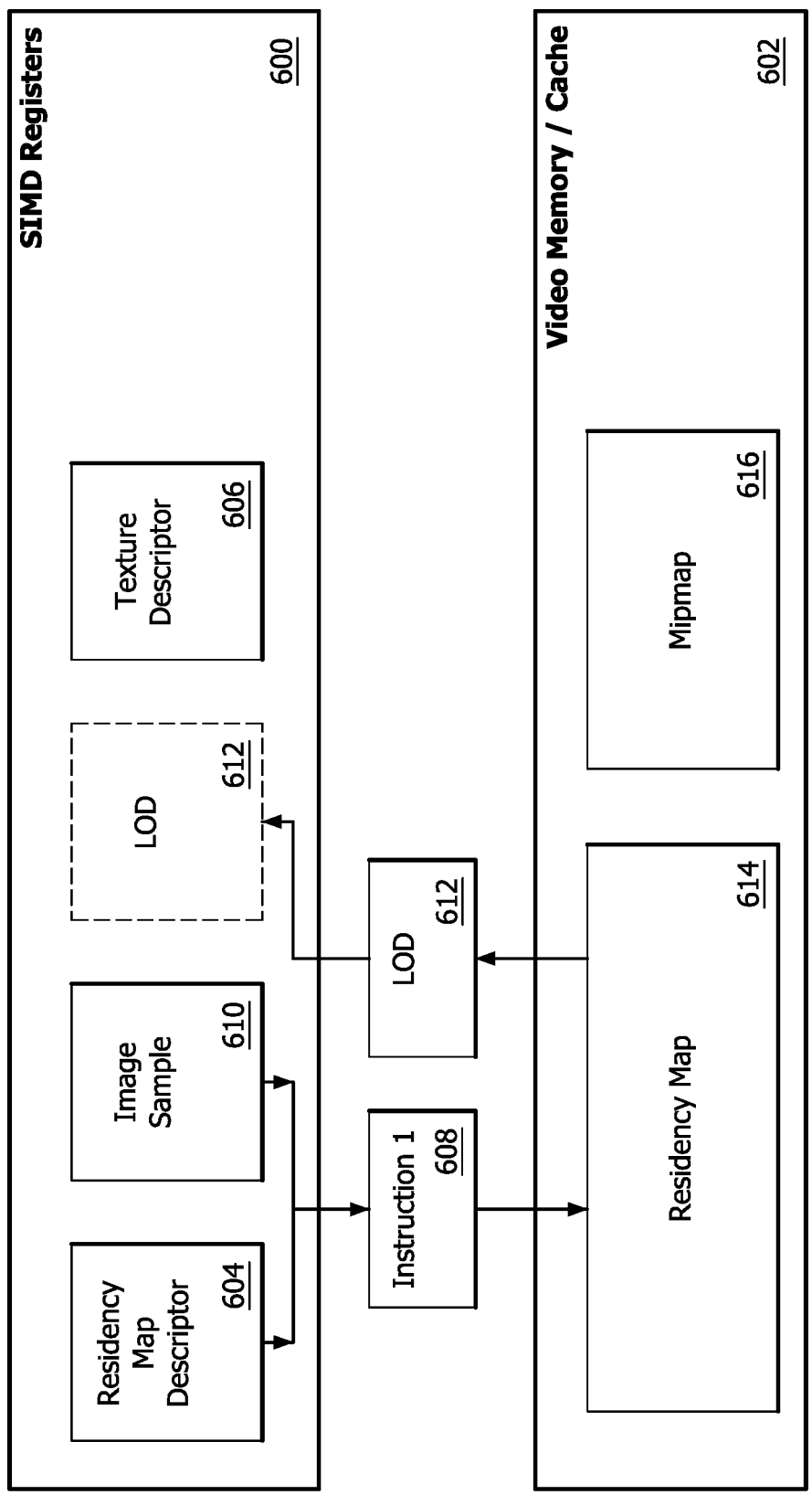
FIG. 6 is a block diagram illustrating example memory accesses for an example first texture sampling instruction.

FIG. 6 is a block diagram illustrating example memory accesses for the first texture sampling instruction described above. The memory accesses are described with respect to SIMD register file 600. SIMD register file 600 is implementable as a part of SIMD units 138 as shown and described with respect to FIG. 2, or in any other suitable hardware of FIG. 2, or otherwise. FIG. 6 also illustrates memory 602, which also reflects any associated cache entries. Memory 602 is implementable in or by memory 104 or a local graphics memory of APD 116 as shown and described with respect to FIGS. 1 and 2, a memory of texture unit 320 as shown and described with respect to FIG. 3, or any other suitable physical memory.

In this example, a residency map descriptor 604 and texture descriptor 606 are stored in the SIMD registers 600. The processor executes the first texture sampling instruction 608 (e.g., as described above) based on the residency map descriptor 604 and a sample 610 of the image to be textured, in order to retrieve LOD 612 from the residency map 614 stored in memory 602 and store LOD 612 in SIMD registers 600.

Figure 7:
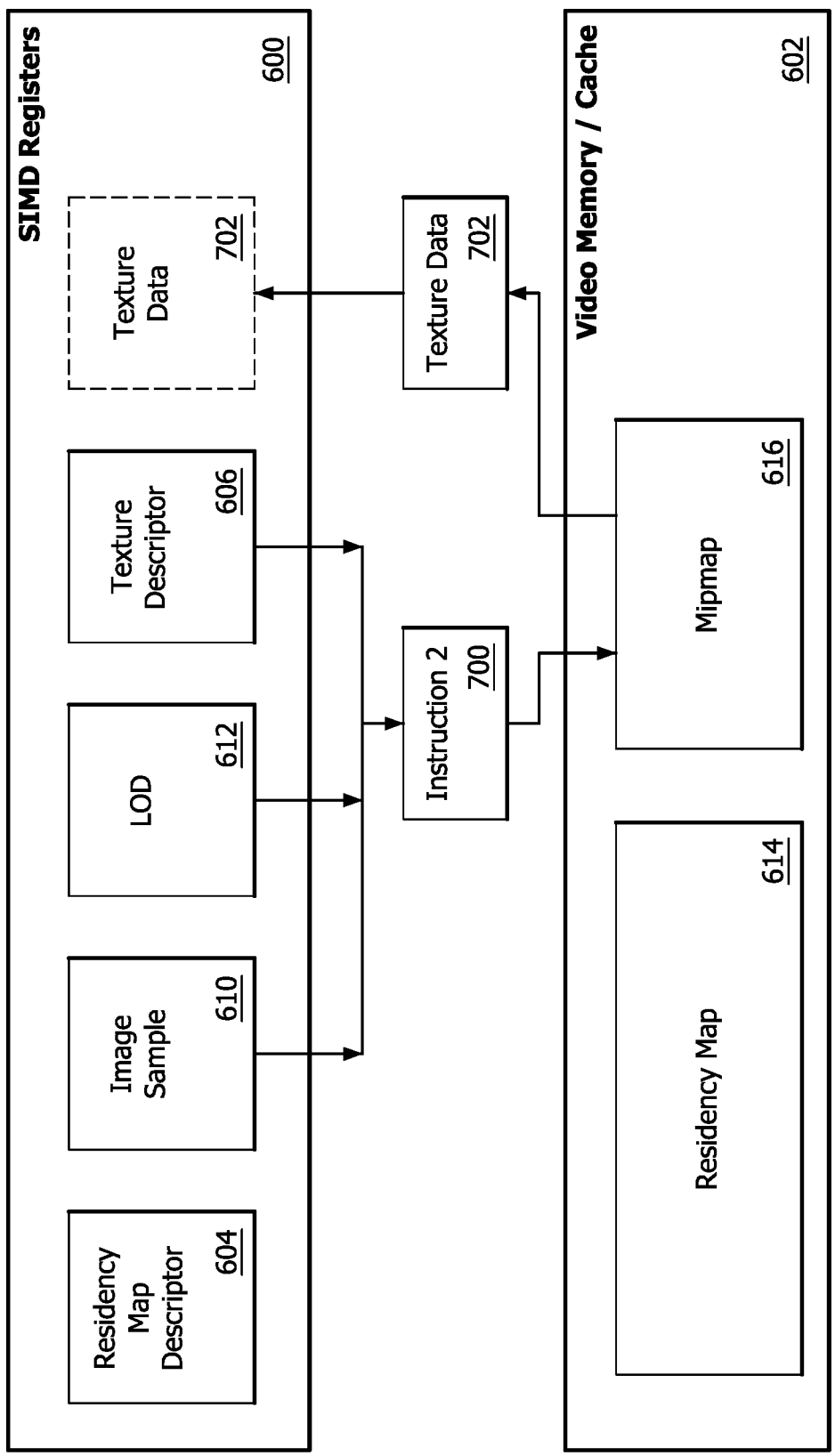
FIG. 7 is a block diagram illustrating example memory accesses for an example second texture sampling instruction.

FIG. 7 is a block diagram illustrating example memory accesses for the second texture sampling instruction described above. After LOD 612 is available in SIMD registers 600, the processor executes a second texture sampling instruction 700 based on LOD 612, texture descriptor 606, and image sample 610 to retrieve texture data 702 from mipmap 616. The retrieved texture data 702 is stored in SMID registers 600 in this example.

The texture sampling described above with respect to the example first and second texture sampling instructions described above require two separate memory accesses to fetch texture data 702—one to resolve the LOD, and one to fetch the texture. This dependent fetch operation has the potential to cause delays from up to two separate cache misses. Accordingly, in some implementations, performance is increased in some cases by reducing the number of video memory accesses to one.

Figure 8:
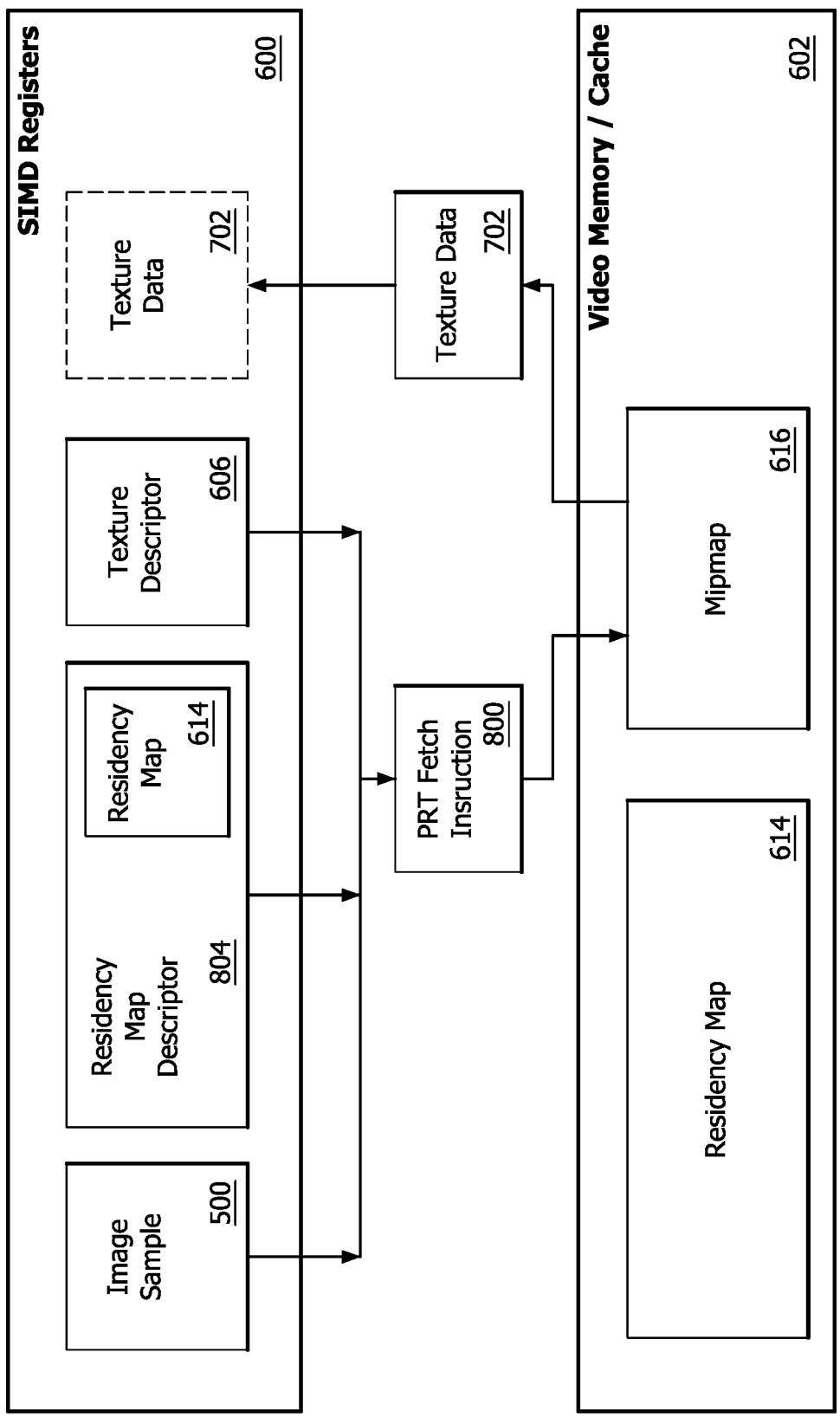
FIG. 8 is a block diagram illustrating example memory accesses for an example PRT fetch sampling instruction.

FIG. 8 is a block diagram illustrating example memory accesses for an example PRT texture fetch instruction. In this example, a residency map descriptor 804 includes residency map 614. The processor executes the PRT texture fetch instruction 800 based on the residency map descriptor 804, a sample 610 of the image to be textured, and texture descriptor 606 to retrieve texture data 702 from mipmap 616. The retrieved texture data 702 is stored in SMID registers 600 in this example.

Residency map descriptor 804 includes the residency map 614 in this example. Accordingly, residency map descriptor 804 is larger in size than residency map descriptor 604 shown and described with respect to FIGS. 6 and 7. However, since residency map descriptor 804 itself includes the residency map, determination of the LOD (corresponding to LOD 612 described with respect to FIGS. 6 and 7) can take place as a part of the execution of PRT texture fetch instruction 800, rather than requiring an initial instruction to retrieve the LOD from residency map 614 stored in video memory 602.

In some cases, retrieving texture data 702 using only one instruction (e.g., PRT texture fetch instruction 800), rather than two, has the advantage of increasing performance by reducing processing time due to memory access latency. In some implementations, this is true even in cases where the residency map descriptor (e.g., residency map descriptor 804) is larger in size than in the two-instruction case, e.g., due to including the residency map as an immediate value (e.g., residency map 614). In some implementations, the residency map descriptor is not in fact larger in size than in the two-instruction case. For example, residency map descriptor 604 includes fields (e.g., pointers to memory) that residency map descriptor 804 does not require (e.g., because it includes an immediate value and does not point to memory). Thus, in some cases, the residency map descriptor in the one-instruction (immediate value) case is the same size or smaller than the residency map descriptor in the two-instruction (pointer) case.

In some implementations, an application can control the size of a residency map descriptor that includes the actual residency map (i.e., as an immediate value, in the one-instruction case) by controlling the number of tiles into which the texture is divided. For example, in some implementations, the residency map descriptor with an embedded immediate value residency map is made smaller, the same size as, or larger than a residency map descriptor without an embedded immediate value residency map (e.g., which points to the residency map in memory), e.g., by adjusting the number of tiles where a larger number of tiles results in a larger the embedded residency map and therefore a larger descriptor.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, texture processing unit 320, and so forth) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for sampling partially resident texture data, the method comprising:
   receiving, by processor circuitry, an instruction which includes a residency map descriptor, wherein the residency map descriptor comprises a residency map; and
   executing, by the processor circuitry, the instruction to retrieve partially resident texture data from a mipmap stored in a memory based on the residency map descriptor.

2. The method of claim 1, wherein the residency map descriptor comprises information indicating how a residency map is stored in the memory.

3. The method of claim 1, wherein the residency map descriptor includes a specification of a register that stores the residency map descriptor.

4. The method of claim 1, wherein the residency map descriptor includes a specification of a register that stores a residency map.

5. The method of claim 1, wherein the instruction includes an indication of an image sample and an indication of a mipmap descriptor, further comprising executing the instruction to retrieve partially resident texture data from a mipmap stored in the memory based on the residency map descriptor, the indication of the image sample, and the indication of the mipmap descriptor.

6. The method of claim 5, wherein the image sample comprises coordinates of an image.

7. The method of claim 5, wherein the indication of the image sample includes a specification of a register that stores the image sample.

8. The method of claim 5, wherein the mipmap descriptor comprises information indicating how the mipmap is stored in the memory.

9. The method of claim 5, wherein the indication of the mipmap descriptor includes a specification of a register that stores the mipmap descriptor.

10. A processor configured for sampling partially resident texture data, the processor comprising:
    circuitry configured to receive an instruction which includes a residency map descriptor, wherein the residency map descriptor comprises a residency map; and
    circuitry configured to execute the instruction to retrieve partially resident texture data from a mipmap stored in a memory based on the residency map descriptor.

11. The processor of claim 10, wherein the residency map descriptor comprises information indicating how a residency map is stored in the memory.

12. The processor of claim 10, wherein the residency map descriptor includes a specification of a register that stores the residency map descriptor.

13. The processor of claim 10, wherein the residency map descriptor includes a specification of a register that stores a residency map.

14. The processor of claim 10, wherein the instruction includes an indication of an image sample and an indication of a mipmap descriptor, and wherein the circuitry is configured to execute the instruction to retrieve partially resident texture data from a mipmap stored in the memory based on the residency map descriptor, the indication of the image sample, and the indication of the mipmap descriptor.

15. The processor of claim 14, wherein the image sample comprises coordinates of an image.

16. The processor of claim 14, wherein the indication of the image sample includes a specification of a register that stores the image sample.

17. The processor of claim 14, wherein the mipmap descriptor comprises information indicating how the mipmap is stored in the memory.

18. The processor of claim 16, wherein the indication of the mipmap descriptor includes a specification of a register that stores the mipmap descriptor.

* * * * *